July 11, 1939.  J. H. GIVENS  2,166,051
MANUFACTURE AND PRODUCTION OF ARTIFICIAL FILAMENTS,
THREADS, BANDS, AND THE LIKE
Filed Feb. 8, 1938
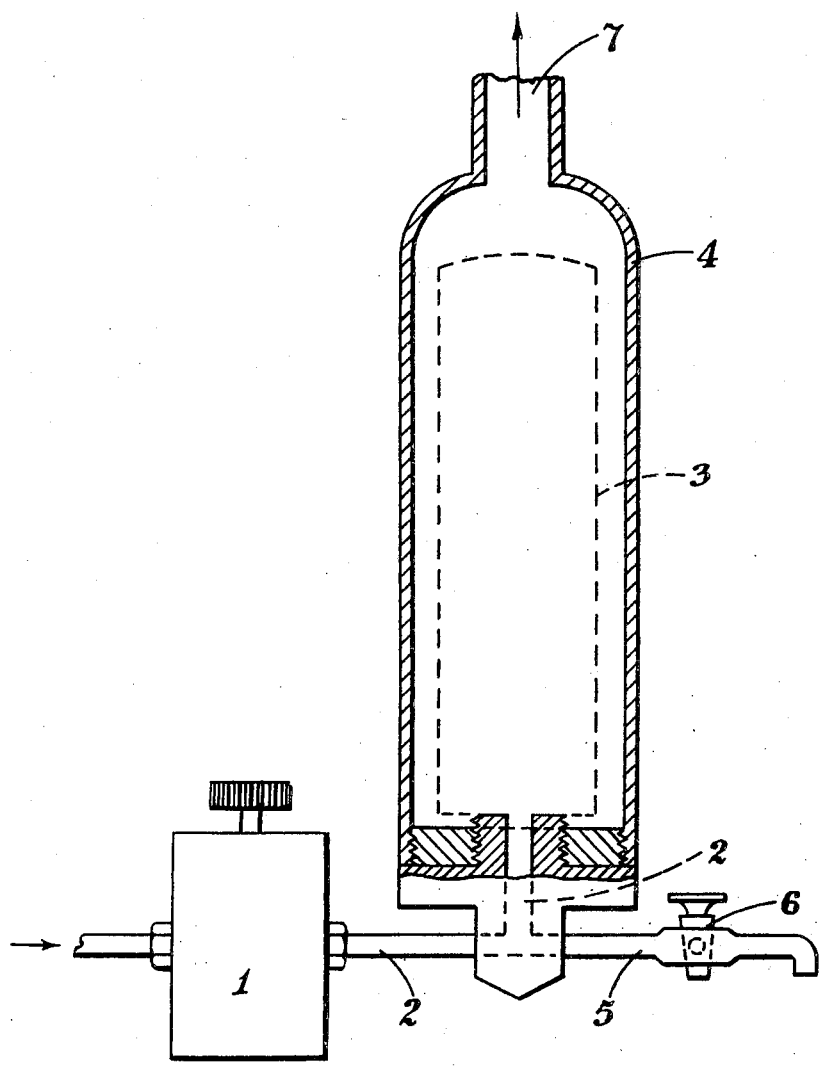
INVENTOR
JOHN HARRISON GIVENS
BY HIS ATTORNEYS
*Howson and Howson*

Patented July 11, 1939

2,166,051

UNITED STATES PATENT OFFICE 2,166,051

MANUFACTURE AND PRODUCTION OF ARTIFICIAL FILAMENTS, THREADS, BANDS, AND THE LIKE

John Harrison Givens, Coventry, England, assignor to Courtaulds, Limited, London, England, a British Company Application February 8, 1938, Serial No. 189,458
In Great Britain February 23, 1937

2 Claims. (Cl. 18—54)

This invention relates to the manufacture and production of artificial filaments, threads, bands and the like, which I will hereinafter refer to as threads, and has, as one of its objects, the production of a more uniform thread.

In the production of artificial threads, a solution is extruded through fine holes in a nozzle, the said nozzle being situated in a bath of a coagulating liquid for wet spinning and in air or other gas for dry spinning. It is usual to feed the solution to each nozzle by means of a pump which delivers equal quantities of solution in equal times, and it is also customary to pass the solution, after it has left the pump, through a filter before it reaches the nozzle. The said filter is usually of the type known as a "candle filter", in which a perforated and fluted barrel, wrapped round with a filtering cloth, is situated inside a casing. The solution is usually passed either into the centre of the barrel, through the filtering material into the casing, and thence to the nozzle, or into the casing through the filtering material into the centre of the barrel and thence to the nozzle.

The filtering material of the filter offers a certain resistance to the passage of the solution, and there is consequently a difference in pressure on the two sides of the filtering material, the pressure being greater on the inlet side. For instance, when using a candle filter the pressure on the inlet side of the filtering medium may be 40 pounds per square inch, and on the outlet side, that is the side in communication with the nozzle, the pressure may be about 30 pounds per square inch. This pressure of say 30 pounds per square inch on the outlet side of the filter is caused by the resistance set up by the nozzle and the small filter which is usually associated therewith.

It is necessary to change the nozzles occasionally, and the intervals at which such changing is necessary may vary considerably, for instance from one hour or less up to several days or even weeks. When the nozzle is removed by unscrewing the union holding it, the pressure on the outlet side of the filtering material drops to zero, while the pressure on the inlet side remains high, although it may be decreased somewhat by stopping the pump. This increased difference in pressure causes a sudden rush of solution through the filter, and the filtering medium is consequently disturbed. As a result there is a tendency for dirt or other material, which had been kept back, to pass through the disturbed filtering medium, so that when spinning is recommenced, the solution first passing to the nozzle contains this dirt or other matter, and gives rise to unsatisfactory thread. This is especially the case when a device, such for example as a reservoir provided with an air cushion, and if desired a flexible diaphragm, as described in British specification No. 395,333, has been included in the system on the inlet side of the filter for compensating for the slight variations in pressure caused by the pump.

According to the present invention the production of unsatisfactory thread after changing the nozzle is avoided by releasing the pressure in the system on the inlet side of the filter immediately or shortly before removing the nozzle. As soon as the pressure on the inlet side is thus released, the pressure on the nozzle side of the filter will remain until the nozzle is removed, and any movement of liquid through the filter will therefore be from the nozzle side to the inlet side, thus preventing any dirt or other material from occupying a position whence it can subsequently pass to the nozzle without going through the filtering material.

In the accompanying drawing, the single figure is an assembly elevation, partly diagrammatic and partly in vertical cross section, of apparatus for carrying out the method according to the preferred embodiment of the present invention.

The release of pressure on the inlet side of the filter can be effected for example, by opening a tap which normally closes one branch of a T-piece inserted in the pipe between the pump and the candle filter. This is illustrated by way of example only in the accompanying drawing in which the pump 1 is connected by a pipe 2 to the interior of a filter candle 3 housed in a filter case 4 having an outlet 7 connected with a nozzle (not shown). The pipe line 2 has a branch pipe 5 provided with a tap 6.

In operation the thread-forming solution, such as viscose, is pumped by the pump 1 along the pipe line 2 to the interior of the filter candle 3. During spinning, viscose passes through the filtering medium 3 and thence through the outlet 7 to the nozzle, the tap 6 in the branch pipe 5 being kept closed. When, however, it is desired to remove the nozzle, for example for the purpose of changing or cleaning it, the tap 6 is opened immediately before removing the nozzle and if desired the pump 1 is stopped. Viscose then flows from the interior of the filter through the pipes 2 and 5 and the tap 6 so that disturbance of the filtering medium due to the sudden passage of a large volume of solution through it is prevented.

It will be understood that the invention is not restricted to the particular arrangement of apparatus shown.

This invention is also useful when producing threads from solutions containing an added material such as a pigment in suspension. The filter normally holds up a very small proportion of the added material. This holding up, however, is not materially harmful while the production of the thread is continued without interruption. When, however, there is a sudden flow of a large volume of solution through the filtering medium as for example when changing the nozzle, some of the suspended material which has been held up is dislodged and the solution in its vicinity then contains a greater proportion of the added material than does the normal supply. If this mixture is allowed to pass through the filtering medium from the inlet to the nozzle side when the nozzle is changed, the thread subsequently spun is liable to contain more of the suspended material than the thread normally spun. When, however, according to this invention, the pressure is first released on the inlet side of the filtering material, the possibility of extra suspended material passing through the filtering material is removed or greatly reduced, and the danger of obtaining an abnormal thread is correspondingly removed or reduced.

What I claim is:

1. In the manufacture and production of artificial threads wherein a solution is passed by means of a pump through a filter, such as a candle filter, and then through a nozzle the method of avoiding the production of unsatisfactory thread when spinning is recommenced after removal and replacement of the nozzle, which comprises, the step of releasing the pressure in the system on the inlet side of the filter immediately or shortly before removing the nozzle.

2. In the manufacture and production of artificial threads wherein a solution is passed by means of a pump along a supply pipe through a filter and then through a nozzle the method of avoiding the production of unsatisfactory thread when spinning is recommenced after removal and replacement of the nozzle, which comprises, the step of releasing the pressure in the system on the inlet side of the filter immediately or shortly before removing the nozzle, by opening a tap in or connected to the supply pipe between the pump and the filter.

JOHN HARRISON GIVENS.